A. O. HUNSAKER AND J. C. WOODMANCY.
VEHICLE SPRING.
APPLICATION FILED JAN. 22, 1917. RENEWED APR. 12, 1920.

1,359,705.                                          Patented Nov. 23, 1920.

WITNESSES:
J. A. Klestermann
B. J. Richards

INVENTOR.
Alonzo O. Hunsaker &
John C. Woodmancy.
BY
THEIR ATTORNEY.

UNITED STATES PATENT OFFICE.

ALONZO O. HUNSAKER AND JOHN C. WOODMANCY, OF CHICAGO, ILLINOIS, ASSIGNORS TO STABLEFORD TRUCK MANUFACTURING CO., OF CHICAGO, ILLINOIS, A CORPORATION OF ARIZONA.

VEHICLE-SPRING.

1,359,705.      Specification of Letters Patent.     Patented Nov. 23, 1920.

Application filed January 22, 1917, Serial No. 143,823. Renewed April 12, 1920. Serial No. 373,387.

*To all whom it may concern:*

Be it known that we, ALONZO O. HUNSAKER and JOHN C. WOODMANCY, citizens of the United States, and residents of the city of Chicago, county of Cook, and State of Illinois, have invented certain new and useful Improvements in Vehicle-Springs, of which the following is a specification.

Our invention relates to improvements in vehicle springs, and has for its object the provision of an improved construction of this character whereby swaying of the vehicle will be prevented, a secure mounting for the springs provided, and the coöperating axle of the vehicle stiffened and strengthened.

The invention consists in the combinations and arrangements of parts hereinafter described and claimed.

Figure 1:
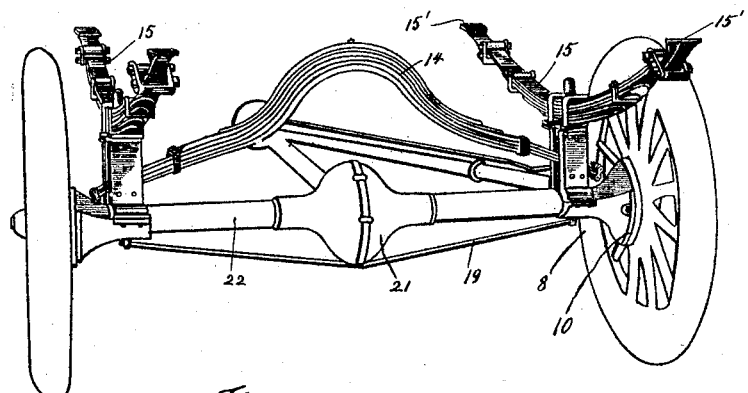
Figure 2:
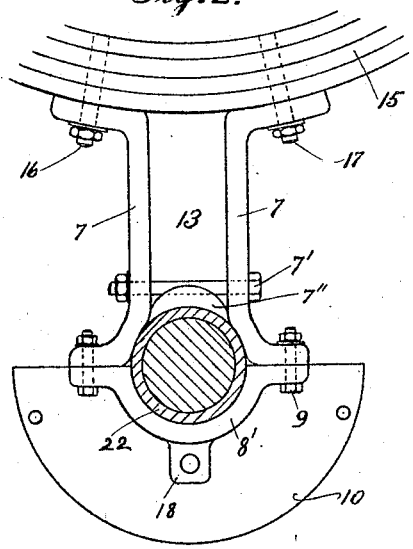
Figure 3:
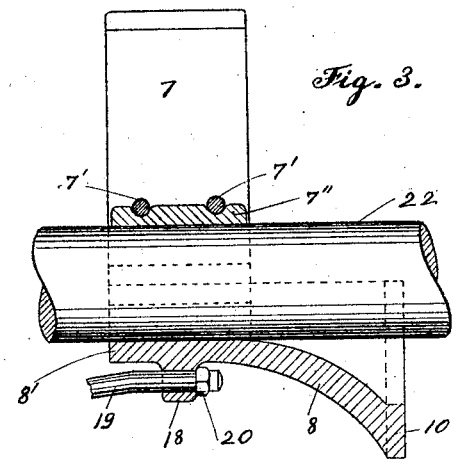
Figure 4:
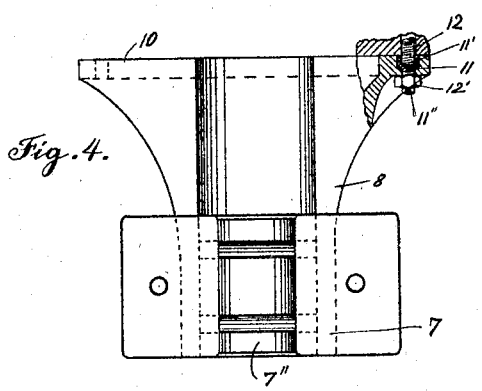
Figures 5, 6:
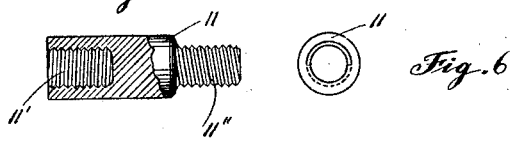

The invention will be best understood by reference to the accompanying drawings forming a part of this specification, and in which, Figure 1 is a perspective view illustrating the springs in position of use, Fig. 2, an enlarged view illustrating one of the supports for the springs, Fig. 3, a view at right angles to Fig. 2, with the spring indicated removed, Fig. 4, a top plan view corresponding to Fig. 2, with the spring indicated, removed, Fig. 5, a detail section illustrating a nipple employed in securing the construction in place, and Fig. 6, an end view of said nipple.

The preferred form of construction, as illustrated in the drawings, comprises a pair of up-standing supports each consisting of two brackets 7 secured together adjacent their lower ends by means of bolts 7′ and each provided with a saddle or clamping block 7″ adapted to rest upon the top of an ordinary automobile axle 22. The brackets 7 are spread at their lower ends to form, in conjunction with the saddles 7″, sockets to rest upon the axle 22. Coöperating with each of said supports is a securing bracket 8 having a semi-cylindrical socket 8′ opposed to the socket of the corresponding support 7 and secured thereto by means of bolts 9 to clamp the support on the axle. Each of the brackets 8 is provided with a semi-circular flange 10 having holes therein adapted to receive nipples 11 provided with threaded sockets 11′ adapted to receive the ordinary axle flange bolts 12 to secure the bracket 8 in place on the axle. Nipples 11 are provided with threaded bolt projections 11″ adapted to receive the usual nuts 12′ for securing the bracket 8 in place. Each of the supports 7 is thus formed with a central opening or perforation 13 adapted to permit the passage of the ends of the ordinary vehicle spring 14 which has its ends secured to the ends of the axle and its central portion secured to the bottom of the vehicle or automobile body, in the usual manner, the construction illustrated being that of the ordinary Ford automobile. An ordinary semi-elliptical spring 15 is mounted upon the upper end of each of the supports 7 to extend longitudinally with respect to the vehicle and is provided, at its ends, with the usual securing brackets 15′ by means of which the same may be secured to the bottom of the vehicle body, above the corresponding supports 7. Each of the springs 15 is preferably secured to the corresponding support 7 by means of bolts 16 and 17, as indicated. A perforated lug 18 is provided on the under side of each of the brackets 8 and a tie or truss rod 19 is passed through said lugs and secured thereto by means of nuts 20 threaded on the ends thereof, said tie rod 19 being arranged also to rest upon the ordinary differential housing 21 formed at the center of the axle 22.

By this arrangement the vehicle body will be adequately supported to prevent swaying thereof under heavy loads, and the axle itself greatly strengthened and stiffened by means of the truss construction effected by the tie rod 19 and the axle 22.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention what we claim as new and desire to secure by Letters Patent is:

1. The combination with an axle and a spring having its ends connected with said axle, of supports secured to opposite ends of said axle, each provided with an opening to permit the passage of said spring ends; and a supplemental spring on the top of each of said supports and arranged to be secured to the bottom of a vehicle body above and in substantially the same longitudinal plane as said support, substantially as described.

2. The combination with an axle and a spring having its ends connected with said axle, of supports secured to opposite ends of said axle, each provided with an opening to permit the passage of said spring ends; and a semi-elliptical leaf spring on top of each of said supports and arranged to be secured to the bottom of a vehicle body above said support, to extend longitudinally with respect to said vehicle, substantially as described.

3. The combination with an axle, having securing flanges at the ends thereof, and a spring having its ends connected with said axle, of upstanding supports having sockets at their bottoms, adapted to partially embrace and rest upon said axle, each of said supports having an opening to permit the passage of said spring ends; brackets having semi-cylindrical sockets partially embracing and resting against the bottom of said axle, said brackets having flanges bolted to the axle flanges; bolts securing the supporting sockets to the bracket sockets to clamp upon the axle; and springs on the upper ends of said supports and arranged to be secured to the bottom of a vehicle body, above and in substantially the same longitudinal plane as said supports, substantially as described.

4. The combination with an axle, having securing flanges at the ends thereof, and a spring having its ends connected with said axle, of upstanding supports having sockets at their bottoms, adapted to partially embrace and rest upon said axle, each of said supports having an opening to permit the passage of said spring ends; brackets having semi-cylindrical sockets partially embracing and resting against the bottom of said axle, said brackets having flanges bolted to the axle flanges; bolts securing the supporting sockets to the bracket sockets to clamp upon the axle; a semi-elliptical leaf spring on the top of each of said supports and arranged to be secured to the bottom of a vehicle body above the corresponding support to extend longitudinally with respect to said vehicle; and threaded sockets, having threaded studs thereon for securing said securing flanges in place, substantially as described.

In testimony whereof we have signed our names to this specification in the presence of two subscribing witnesses.

ALONZO O. HUNSAKER.
JOHN C. WOODMANCY.

Witnesses:
JOSHUA R. H. POTTS,
HELEN F. LILLIS.